(12) United States Patent
Perchak et al.

(10) Patent No.: US 7,497,021 B2
(45) Date of Patent: Mar. 3, 2009

(54) MULTI-AXIS BUBBLE VIAL DEVICE

(75) Inventors: Robert M. Perchak, Dayton, OH (US); Robin Gwen McCarty, Fairborn, OH (US)

(73) Assignee: Trimble Navigation Limited, Sunnyvale, CA (US)

( * ) Notice: Subject to any disclaimer, the term of this patent is extended or adjusted under 35 U.S.C. 154(b) by 7 days.

(21) Appl. No.: 11/338,051

(22) Filed: Jan. 24, 2006

(65) Prior Publication Data

US 2007/0169362 A1     Jul. 26, 2007

(51) Int. Cl.
G01C 9/06        (2006.01)
G01C 9/36        (2006.01)

(52) U.S. Cl. .............. 33/366.16; 33/366.12; 33/366.23

(58) Field of Classification Search .............. 33/366.11, 33/366.12, 366.14, 366.15, 366.16, 366.23, 33/379; 359/139.1
See application file for complete search history.

(56) References Cited

U.S. PATENT DOCUMENTS

| | | | | |
|---|---|---|---|---|
| 1,563,321 | A * | 12/1925 | Bedortha | 33/348 |
| 1,683,256 | A * | 9/1928 | Myers | 33/385 |
| 4,407,075 | A * | 10/1983 | MacDermott et al. | 33/348.2 |
| 4,583,296 | A * | 4/1986 | Dell'Acqua | 33/366.12 |
| 4,755,801 | A | 7/1988 | Gooley | |
| 5,111,039 | A | 5/1992 | Froning | |
| 5,218,771 | A | 6/1993 | Redford | |
| 5,371,951 | A * | 12/1994 | Piske | 33/366.12 |
| 5,933,393 | A * | 8/1999 | Kitajima | 368/268 |
| 5,953,116 | A | 9/1999 | Ohtomo et al. | |
| 6,073,355 | A * | 6/2000 | Chiang et al. | 33/366.11 |
| 6,248,989 | B1 | 6/2001 | Ohishi | |
| 6,320,653 | B1 * | 11/2001 | Feist | 356/139.1 |
| 6,647,634 | B2 | 11/2003 | Yang et al. | |
| 6,898,015 | B2 * | 5/2005 | Yoshikawa et al. | 359/619 |
| 2007/0169362 | A1 * | 7/2007 | Perchak et al. | 33/366.16 |
| 2008/0235966 | A1 * | 10/2008 | Klapper et al. | 33/366.23 |

FOREIGN PATENT DOCUMENTS

| | | | |
|---|---|---|---|
| DE | 36 34 244 A1 | | 4/1988 |
| DE | 1005052235 A | * | 5/2007 |
| DE | 1005056736 A | * | 5/2007 |
| DE | 102006056072 B3 | * | 3/2008 |
| FR | 2868834 A1 | * | 10/2005 |

(Continued)

Primary Examiner—R. A. Smith
(74) Attorney, Agent, or Firm—Dinsmore & Shohl LLP (57) ABSTRACT

A multi-axis bubble vial device includes a bubble vial having a vial body defining a fluid chamber with a curved upper surface, and a quantity of fluid partially filling the chamber. The fluid defines a bubble in the upper portion of the chamber that moves along the upper surface in dependence upon the orientation of the vial. A centrally positioned light source above the bubble vial directs light into the chamber, and four light sensors, positioned above the bubble vial and arranged circumferentially around the centrally positioned light source, detect the reflection of light from a reflector beneath the fluid chamber. A first pair of the sensors is positioned on opposite sides of the light source along a first axis, and a second pair of the sensors is positioned on opposite sides of the light source along a second axis. The second axis is substantially perpendicular to the first axis.

33 Claims, 6 Drawing Sheets

FOREIGN PATENT DOCUMENTS

| | | | | |
|---|---|---|---|---|
| GB | 2113383 | A | * | 8/1983 |
| GB | 2238382 | A | * | 5/1991 |
| JP | 60138415 | A | * | 7/1985 |
| JP | 61040505 | A | * | 2/1986 |
| JP | 63030713 | A | * | 2/1988 |
| JP | 01083106 | A | * | 3/1989 |
| JP | 01101412 | A | * | 4/1989 |
| JP | 10185557 | A | * | 7/1998 |
| JP | 2004061402 | A | * | 2/2004 |
| JP | 2005331350 | A | * | 12/2005 |
| WO | WO 9604524 | A1 | * | 2/1996 |

* cited by examiner

MULTI-AXIS BUBBLE VIAL DEVICE

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

Level vials of various types are used in a wide variety of control systems in which the orientation of a machine element is measured and controlled. Typically, the vial is secured to the machine element. The vial moves with the element and provides an electrical output or outputs that indicate the orientation of the level vial and the machine element with respect to at least one axis. Such level vials may, for example, form a part of a system that controls the orientation of a laser beam transmitter and the orientation of the beam produced by the transmitter. Preferably two level vials are included in a transmitter of this type, with each vial providing an indication of orientation of the transmitter with respect to one of a pair of substantially orthogonal axes.

Typically a level vial includes a glass or plastic vial casing that defines an elongated fluid chamber. The chamber has a curved upper surface which slopes downward, away from the center of the vial. The chamber is partially filled with fluid so that an air bubble is trapped in the chamber with the fluid. As the level vial is tilted about a generally horizontal axis, normal to the direction of elongation of the chamber, the bubble in the vial moves across the curved surface of the chamber toward the more elevated of the two ends. The degree of movement of the bubble is an indication of the orientation of the vial with respect to the horizontal. Various arrangements have been used to detect the position of the bubble and to produce an electrical signal that is dependent upon the orientation of the level vial and therefore indicates the orientation of the machine element.

One type of level vial comprises an electrically nonconductive vial casing, usually made of glass, that defines an elongated, arcuate chamber which curves generally downward toward its opposite ends. A quantity of electrically conductive fluid is provided in the chamber. Such a fluid may, for example, have a ketone component. A pair of end electrodes electrically communicate with the upper portions of the chamber adjacent its opposite ends and extend toward the central portion of said chamber.

A common electrode extends substantially the entire length of the chamber along its lower surface. The air bubble in the chamber rises to whatever portion of the chamber is uppermost. It will be appreciated that, as the vial is tilted in one direction, the electrical impedance of a path from one end electrode through the electrically conductive fluid to the common electrode will increase, while the electrical impedance of a path from the other end electrode to the common electrode will decrease. When the vial is tilted in the opposite direction, the end-electrode-to-common-electrode impedances change in the opposite fashion. While this level vial arrangement functions well, it requires that lead connections be provided both above and below the level vial. This, in turn, means that all associated components cannot be mounted on a single circuit board. Additionally, two such level vials are required to assess the orientation of a machine element about two horizontal axes.

Other level vials use a photo-optical arrangement for detecting the position of the bubble in the fluid chamber. In one such arrangement, a light source emits a beam of light which passes through the chamber and is detected by a pair of photodetectors adjacent opposite ends of the vial. As the bubble moves toward one of the ends of the vial, the amount of light reaching the photodetectors is changed, and the relative electrical output signals from the photodetectors provide an indication of the degree of tilt of the vial. This level vial arrangement has the disadvantage of requiring components above and below the vial in order to determine the position of the beam. The disadvantage of this arrangement is that it requires that a light source and photo-detectors, and their associated electrical connections, be provided both above and below the level vial. As with the other type of level vial discussed above, this means that all associated components cannot be mounted on a single circuit board. Additionally, two such level vials are required to assess the orientation of a machine element about two horizontal axes.

It is seen that there is a need, therefore, for a level vial construction in which all of the electrical components can be mounted on a single circuit board, and for such a level vial construction in which inclination with respect to two substantially orthogonal axes may be measured with a single level vial.

SUMMARY OF THE INVENTION

A multi-axis bubble vial device, constructed according to the present invention, meets these needs. The device includes a bubble vial having a transparent vial body defining a fluid chamber with a curved upper surface, and a quantity of fluid partially filling the chamber. The fluid defines a bubble in the upper portion of the chamber which moves along the upper surface in dependence upon the orientation of the vial. A centrally positioned light source, above the bubble vial, directs light into the chamber. Four light sensors are positioned above the bubble vial and arranged circumferentially around the centrally positioned light source. A first pair of the sensors is positioned on opposite sides of the light source along a first axis. A second pair of light sensors is positioned on opposite sides of the light source along a second axis. The second axis is substantially perpendicular to the first axis. A reflector is positioned beneath the fluid chamber, such that light emitted from the light source passes through the bubble and the fluid, and is reflected by the reflector back to the light sensors. The relative levels of light detected by the first pair of sensors indicate the orientation of the first axis with respect to horizontal, and the relative levels of light detected by the second pair of sensors indicate the orientation of the second axis with respect to horizontal.

The reflector comprises a mirrored reflector positioned beneath the bubble vial. The reflector may comprise a mirror having a reflective surface, the mirror being adhesively secured to the bubble vial by an adhesive having a refractive index which is substantially the same as the refractive index of the material from which the bubble vial is made.

The reflector may comprise a reflective coating in the fluid chamber on the surface of the chamber opposite to the curved surface. The surface opposite the curved surface is preferably substantially flat.

The centrally positioned light source comprises a light emitting diode. Each of the four light sensors comprises a photodiode.

The sides of the fluid chamber between the curved upper surface and the opposite surface are preferably light absorbing, whereby extraneous light reflections are reduced. The bubble vial may be shielded from extraneous light that might otherwise introduce error into the measurement of the orientations of the device along the first and second axes. The reflector may comprise a reflective coating on the outside, bottom surface of the bubble vial.

A multi-axis orientation determination device according to the present invention uses such a multi-axis bubble vial device. The multi-axis orientation determination device includes a bubble vial having a transparent vial body defining a fluid chamber with a curved upper surface, and a quantity of fluid partially filling the chamber to define a bubble in the upper portion of the chamber. The bubble moves along the upper surface in dependence upon the orientation of the vial. A centrally positioned light source is mounted above the bubble vial, directing light into the chamber, and light sensors are positioned above the bubble vial and arranged circumferentially around the centrally positioned light source. A first pair of the sensors is positioned on opposite sides of the light source along a first axis, and a second pair of the sensors is positioned on opposite sides of the light source along a second axis. The second axis is substantially perpendicular with respect to the first axis. Each of the sensors provides an electrical output signal in dependence upon received light. A reflector is positioned beneath the fluid chamber such that light emitted from the light source passes through the bubble and the fluid and is reflected by the reflector to the light sensors. A first circuit, responsive to the electrical output signals from the first pair of sensors, provides an indication of the orientation of the bubble vial in the direction of the first axis from the relative levels of light detected by the first pair of sensors. A second circuit, responsive to the electrical output signals from the second pair of sensors, provides an indication of the orientation of the bubble vial in the direction of the second axis from the relative levels of light detected by the second pair of sensors.

It is an object of the present invention, therefore, to provide a multi-axis bubble vial device, and a multi-axis orientation determination device including such a bubble vial device, in which the orientation of the bubble vial device may be determined with a single device, and in which the electrical connectors are all positioned on a single side of the device for connection to a printed circuit board. Other objects and advantages of the invention will be apparent from the following description, the accompanying drawings, and the appended claims.

DETAILED DESCRIPTION OF THE PREFERRED EMBODIMENT

Figure 1:
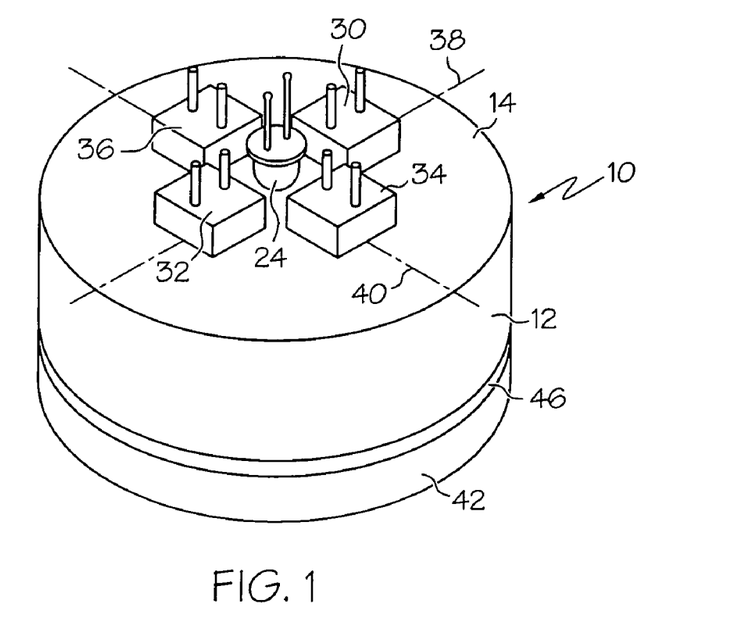
FIG. 1 is a perspective view of a multi-axis bubble vial device according to the present invention.
Figure 2:
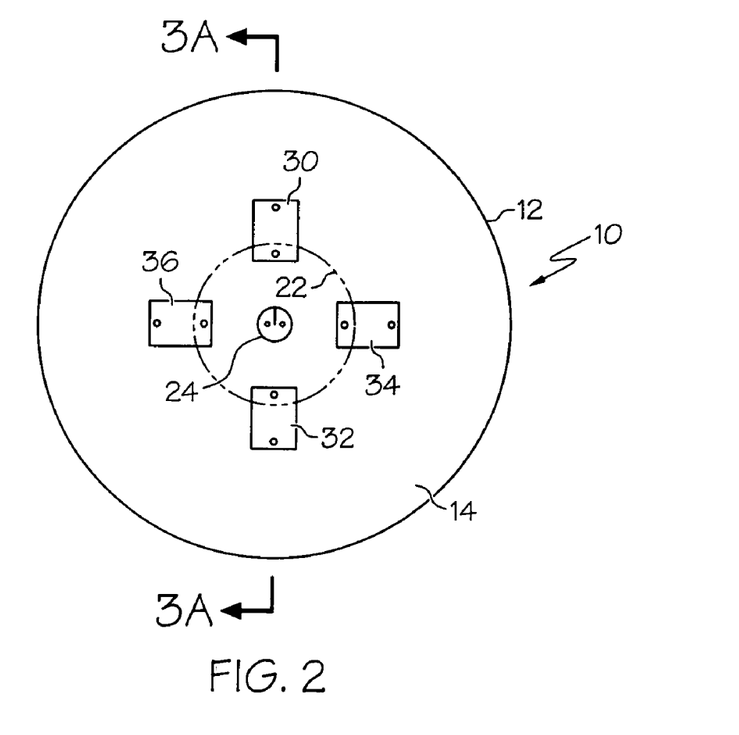
FIG. 2 is a plan view of the multi-axis bubble vial device of FIG. 1.
Figure 3A:
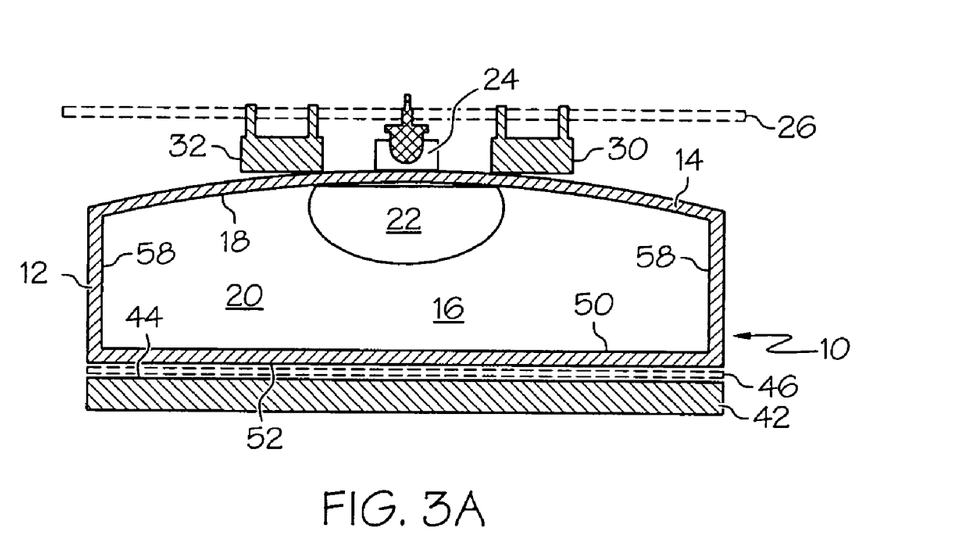
FIG. 3A is a sectional view of the multi-axis bubble vial device taken generally along line 3-3 in FIG. 2.

The present invention relates to a multi-axis bubble vial device, and to a multi-axis orientation determination device using such a bubble vial device. The bubble device 10 is shown in FIGS. 1, 2 and 3A. The device includes a bubble vial 12 having a vial body 14 that defines a fluid chamber 16 with a curved upper surface 18. As will become apparent, at least the upper portion of the bubble vial body 14 defining the curved surface 18 is transparent. A quantity of fluid 20 partially fills the chamber 16, trapping a gas bubble 22 in the upper portion of the chamber 16. The bubble 22 moves along the upper surface 18 in dependence upon the orientation of the vial. This is illustrated diagrammatically in FIGS. 5A and 5B, and will be discussed in greater detail, below.

The bubble vial device 10 further includes a centrally positioned light source, such as light emitting diode 24, which is mounted above the bubble vial 12 on a printed circuit board, indicated at 26. The light emitting diode 24 directs light into the chamber 16.

Four light sensors 30, 32, 34, and 36 are positioned above the bubble vial 12 and are arranged circumferentially around the centrally positioned light source 24. Each of the four light sensors 30, 32, 34, and 36 may comprise a photodiode. A first pair of sensors 30 and 32 are positioned on opposite sides of the light source 24 along a first axis 38, and a second pair of sensors 34 and 36 are positioned on opposite sides of the light source 24 along a second axis 40. The second axis 40 is substantially perpendicular to the first axis 38. All of the photodiodes 30, 32, 34 and 36 may be mounted on the printed circuit board, indicated at 26. If desired, the bubble vial 12 may also be mounted on the circuit board 26, by means of adhesive or other mounting structure.

A reflector 42 is positioned beneath the fluid chamber 16, such that light emitted from the light source 24 passes through the bubble 22 and the fluid 20 and is reflected by the reflector 42 to the light sensors 30, 32, 34, and 36. As will be explained, below, the relative levels of light detected by the first pair of sensors 30, 32 indicate the orientation of the first axis 38 with respect to horizontal, and the relative levels of light detected by the second pair of sensors 34, 36 indicate the orientation of the second axis 40 with respect to horizontal. The reflector 42 may be a mirror having a reflective surface 44. The mirror is preferably adhesively secured to the bubble vial 12 by an adhesive 46 having a refractive index which is substantially the same as the refractive index of the material from which the bubble vial body 14 is made. As a consequence, little refraction will occur as light passes through the vial body 14 and the adhesive 46. Preferably the surface 50 opposite the curved surface 18 is substantially flat. As an alternative, the reflector 42 may comprise a reflective coating on the outside, bottom surface 52 of the bubble vial 12.

Figure 3B:
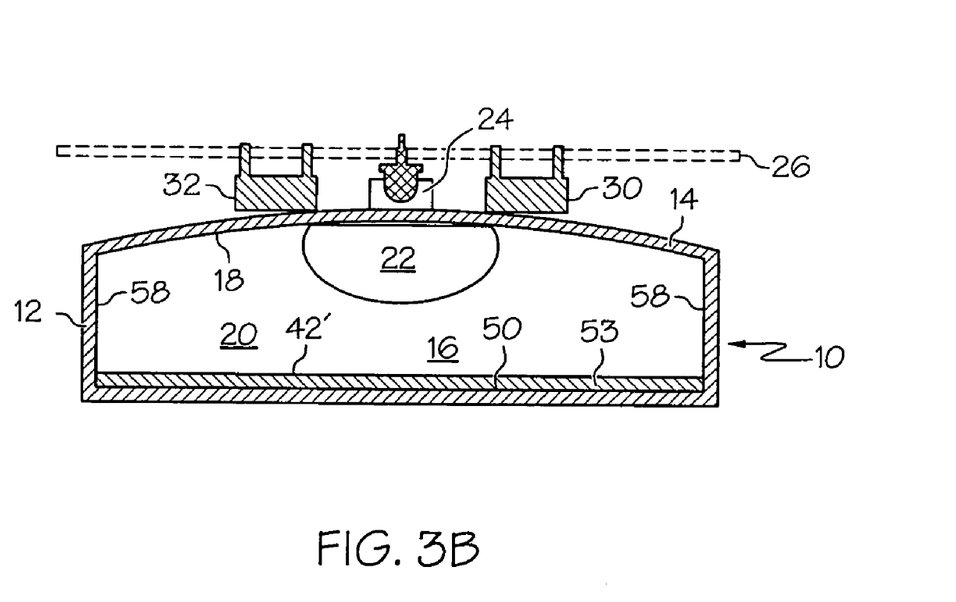
FIG. 3B is a sectional view, similar to that of FIG. 3A, illustrating an alternative construction of the multi-axis bubble vial device according to the present invention.

FIG. 3B is a drawing illustrating an alternative construction of the reflector, in which the components of the multi-axis bubble vial device that correspond to those of the embodiment of FIG. 3A have been labeled with corresponding reference numerals. In the embodiment of FIG. 3B, however, the reflector 42' is a reflective coating in the fluid chamber 16 on the surface 50 of the chamber 16, opposite the curved surface 18. The surface 50 of the chamber 16 is substantially flat. The embodiments of FIGS. 3A and 3B function in the same manner, and therefore are discussed together below.

The side surface 58 of the fluid chamber 16 between the curved upper surface 18 and the opposite surface 50 is preferably coated with a light absorbing coating, or otherwise rendered light absorbing, so that extraneous light reflections are reduced. Further, the bubble vial 12 may be shielded from extraneous ambient light that would otherwise introduce error into the measurements taken for the first and second axes. This shielding may take the form of appropriately positioned coatings on exterior or interior surfaces of the vial 12, or of additional outer structures that shield the interior of the vial 12 from ambient light.

Figure 5A:
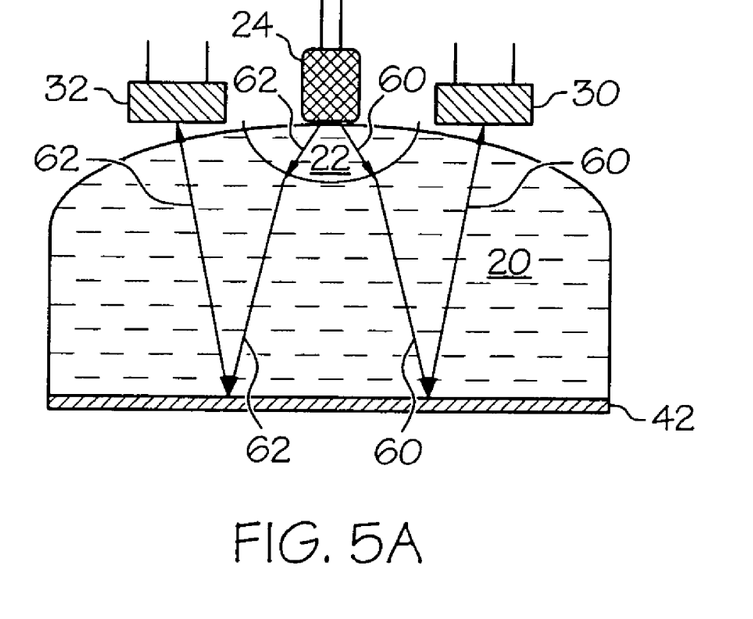
FIGS. 5A and 5B are diagrammatic representations of the vial device, showing its mode of operation.
Figure 5B:
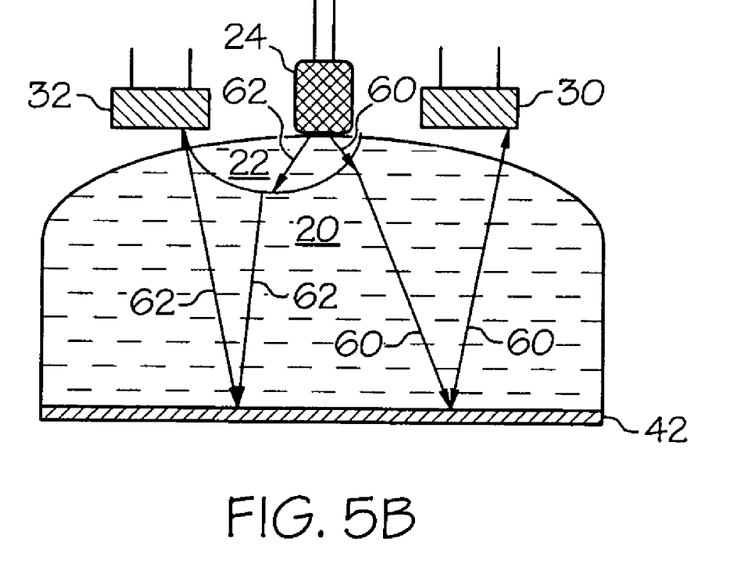

FIGS. 5A and 5B illustrate diagrammatically the manner in which the multi-axis bubble vial device operates. It will be appreciated that these drawings are not to scale, but are presented simply as a means of assisting in the explanation of the invention. FIG. 5A shows the multi-axis bubble vial device in a substantially horizontal orientation. A generally conical shaped beam of light is projected downward by light emitting diode 24. The outer edge of this conical shaped beam is illustrated with rays 60 and 62. The beam is refracted at the interface between the gas bubble 22 and fluid 20. The beam of light continues to diverge as it passes downward through the fluid 20 and is reflected upward by mirror 42. The light finally passes through the upper vial body and illuminates the portion of the photo-detector 30 to the left of ray 60 and the portion of the photodetector 32 to the right of ray 62. Although refraction will occur as the light passes upward from the fluid 20 through the vial 12 and then passes through the air to the photodetectors 30 and 32, because the spacing between the detectors 30 and 32 and the vial 12 is minimal, the effect of this refraction on the portions of the photodetectors that are illuminated is minimal. As will be noted, since the portions of the photo-detectors 30 and 32 that are illuminated are equal, the electrical outputs from the two photo-detectors 30 and 32 will be substantially equal. This indicates that the vial 12 is substantially horizontal along the axis 38 that extends between photo-detectors 30 and 32.

FIG. 5B illustrates the effect of tilting the vial 12 along axis 38, that is, lowering photodetector 30 and raising photodetector 32. As will be immediately noted, the portion of the photo-detector 30 that is illuminated is increased (the area to the left of the ray 60), while at the same time the portion of the photo-detector 32 that is illuminated is decreased (the area to the right of the ray 62. Consequently, the level of the electrical output signal from photo-detector 30 exceeds the level of the electrical output signal from photo-detector 32 when the multi-axis bubble vial device is tilted, as shown.

Figure 4:
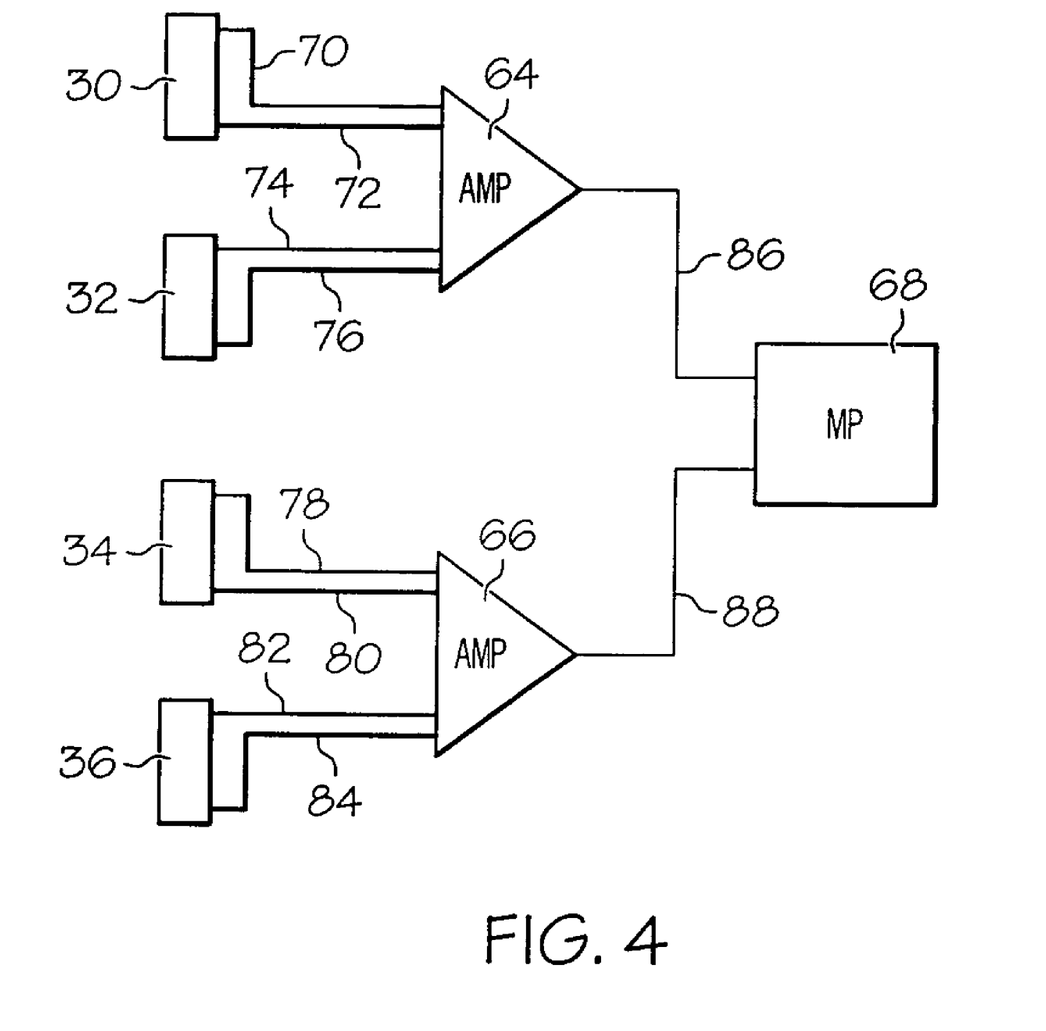
FIG. 4 is a schematic diagram of the circuitry associated with the vial device.

Reference is made to FIG. 4, which shows first and second differential amplifier circuits 64 and 66. The outputs of the differential amplifier circuits are provided to a microprocessor 68. The first amplifier 64 is responsive to the electrical output signals on lines 70, 72, 74, and 76 from the first pair of sensors 30 and 32. The first amplifier 64 provides an indication of the orientation of the bubble vial in the direction of the first axis 38 from the relative levels of light detected by the first pair of sensors 30 and 32. The second amplifier 66 is responsive to the electrical output signals on lines 78, 80, 82, and 84 from the second pair of sensors 34 and 36. The second amplifier 66 provides an indication of the orientation of the bubble vial in the direction of the second axis 40 from the relative levels of light detected by the second pair of sensors 34 and 36. The outputs of the amplifiers 64 and 66 on lines 86 and 88 may then be supplied to a microprocessor 68 for the computation of the orientation of the bubble vial device in a straightforward manner.

Figure 6:
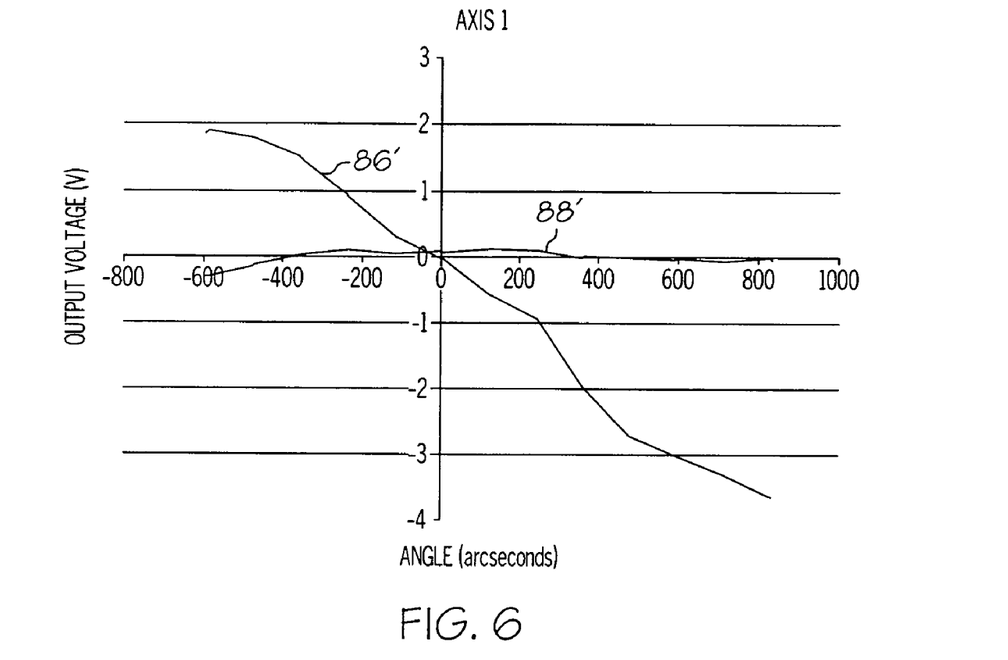
FIGS. 6, 7, and 8 are graphs, illustrating output signals provided by the vial device.
Figure 7:
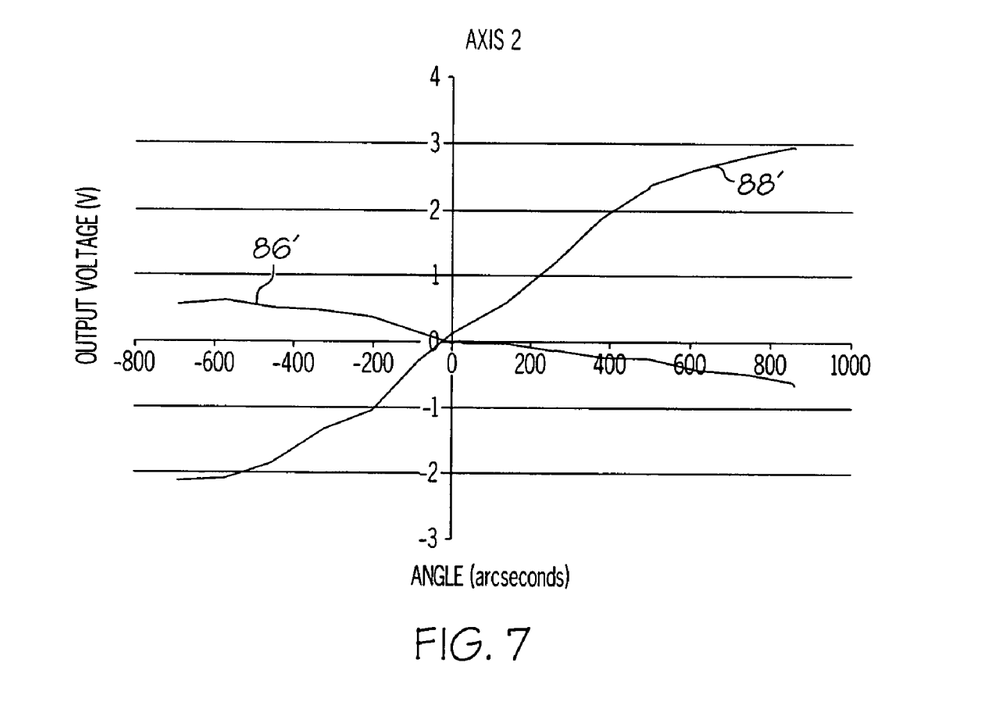
Figure 8:
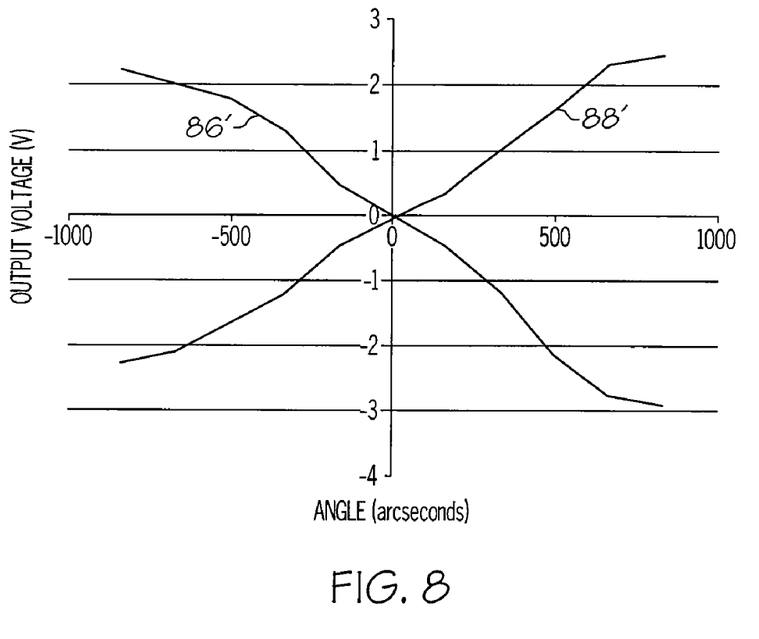

FIGS. 6-8 show the outputs on lines 86 and 88 for various orientations of the device; with 86' being the output signal on line 86 from the differential amplifier 64, and 88' being the output signal on line 88 from the differential amplifier 66. FIG. 6 shows how the output 86' on line 86 changes as the device is tilted only along axis 38. Note that the output 88' on line 88 remains substantially zero during this process. Similarly, FIG. 8 shows how the output 88' changes as the device is tilted only along axis 40. Note that the output 86' on line 86 remains substantially zero during this process. Finally, note how the output voltages on both lines 86 and 88 change as the device is tilted along an axis that is at 45 degrees to both axis 38 and axis 40. Since the outputs on lines 86 and 88 are substantially independent, with little cross talk, the direction and amount of a tilt that occurs along an axis intermediate the axes 38 and 40 can be determined in a straightforward manner.

It will be appreciated that the multi-axis bubble vial device of the present invention has a number of advantages over devices of this type in the prior art. The present invention provides for detecting tilting of the device in either or both of two substantially orthogonal axes. Further, the detection of the bubble position is accomplished with a light source and detectors that are all located on the same side of the device. This permits all of these components to be mounted on a single printed circuit board, as illustrated in FIGS. 3A and 3B, for ease of construction and packaging. Further, the present invention reduces the number of components required to perform the orientation detection function.

It should also be appreciated that while the embodiments illustrated herein have utilized sensors that are arranged to detect tilt along a pair of substantially orthogonal axes, the positions of the sensor pairs may be altered if desired, in order to detect directly the tilt along other, non-orthogonal axes. Additionally, it will be appreciated that the bubble vial of the present invention may include only a single pair of detectors if it is desired to detect only the tilt along a single axis aligned with the detector pair.

Figure 9:
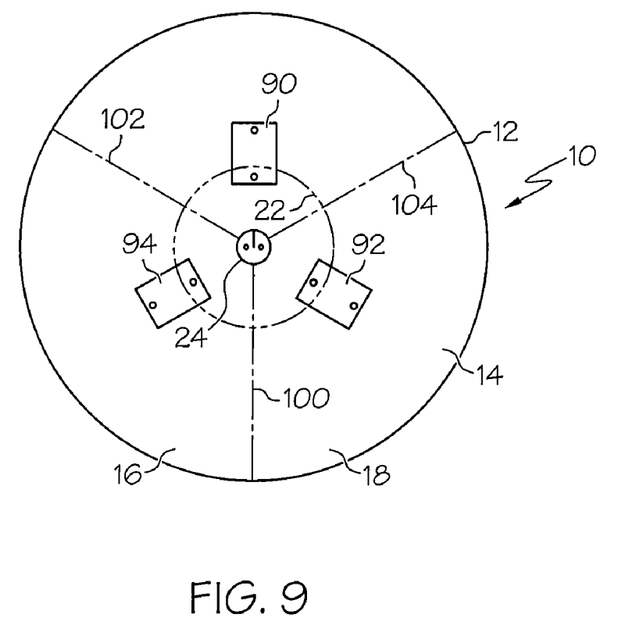
FIG. 9 is a plan view of a multi-axis bubble device, similar to FIG. 2, in which the sensors are arranged differently than illustrated in FIG. 2.

Reference is made to FIG. 9, which illustrates an alternative embodiment of the present invention. FIG. 9 is similar to FIG. 2, and in this regard the same reference numerals are use to refer to corresponding structure. The bubble device 10 includes a bubble vial 12 having a vial body 14 that defines a fluid chamber 16 with a curved upper surface. As with the embodiment of FIGS. 1-3, at least the upper portion of the bubble vial body 14 defines a curved surface 18 that is transparent. A quantity of fluid partially fills the chamber 16, trapping a gas bubble 22 in the upper portion of the chamber 16. The bubble 22 moves along the upper surface 18 in dependence upon the orientation of the vial, as discussed previously in regard to the embodiment of FIGS. 1-3. The bubble vial device 10 further includes a centrally positioned light source, such as light emitting diode 24, which is mounted above the bubble vial 12 on a printed circuit board. The light emitting diode 24 directs light into the chamber 16, in the manner illustrated in regard to the embodiment of FIGS. 1-3.

An odd number of light sensors (in FIG. 9, illustrated as the three light sensors 90, 92, and 94) are positioned above the bubble vial 12 and are arranged circumferentially around the centrally positioned light source 24. Each of the three light sensors 90, 92, and 94 may comprise a photodiode. Sensor 90 is positioned along an axis 100, sensor 92 is positioned along an axis 102, and sensor 94 is positioned along an axis 104. All of the sensors may be mounted on printed circuit board, not shown. If desired, the bubble vial 12 may also be mounted on the circuit board by means of adhesive or other mounting structure.

As with the embodiment of FIGS. 1-3, a reflector is positioned beneath the fluid chamber 16, such that light emitted from the light source 24 passes through the bubble 22 and the fluid 20 and is reflected by the reflector to the light sensors 90, 92, and 94. The relative levels of light detected by the sensors 90, 92, and 94 indicate the orientation of each of the three axes with respect to horizontal. Basically, the difference between each sensor output and the sum of the outputs of the other two sensors is used to determine the level along an axis that passes through the first sensor and between the other two. The equations that follow illustrate the form of the calculations for the three axes 100, 102, and 104.

$$level1 = \frac{sensor1 - (Const)(sensor2 + sensor3)}{sensor1 + sensor2 + sensor3}$$

$$level2 = \frac{sensor2 - (Const)(sensor1 + sensor3)}{sensor1 + sensor2 + sensor3}$$

$$level3 = \frac{sensor3 - (Const)(sensor1 + sensor2)}{sensor1 + sensor2 + sensor3}$$

Thus, the "on axis" sensor is compared with the sum of the other two sensors between which the axis extends to provide an indication of tilt along the axis. Any odd number of sensors may be used in such an arrangement to provide tilt information along an equal number of axes.

While certain representative embodiments and details have been shown for purposes of illustrating the invention, it will be apparent to those skilled in the art that various changes in the invention disclosed herein may be made without departing from the scope of the invention, which is defined in the appended claims.

What is claimed is:

1. A multi-axis bubble vial device, comprising:
    a bubble vial having a vial body defining a fluid chamber with a curved upper surface,
    a quantity of fluid partially filling said chamber, said fluid defining a bubble in the upper portion of said chamber which moves along said upper surface in dependence upon the orientation of said vial,
    a centrally positioned light source above said bubble vial directing light into said chamber,
    four light sensors positioned above said bubble vial and arranged circumferentially around said centrally positioned light source, a first pair of said sensors being positioned on opposite sides of said light source along a first axis, and a second pair of said sensors being positioned on opposite sides of said light source along a second axis, said second axis being substantially perpendicular with respect to said first axis, and
    a reflector beneath said fluid chamber, such that light emitted from said light source passes through said bubble and said fluid and is reflected by said reflector to said light sensors, whereby the relative levels of light detected by said first pair of sensors indicates the orientation of said first axis with respect to horizontal, and the relative levels of light detected by said second pair of sensors indicates the orientation of said second axis with respect to horizontal.

2. The multi-axis bubble vial device of claim 1 in which said reflector comprises a mirrored reflector positioned beneath said bubble vial.

3. The multi-axis bubble vial device of claim 2 in which said reflector comprises a mirror having a reflective surface, said mirror being adhesively secured to said bubble vial by an adhesive having a refractive index which is substantially the same as the refractive index of the material from which said bubble vial is made.

4. The multi-axis bubble vial device of claim 1 in which said reflector comprises a reflective coating in said fluid chamber on the surface of said chamber opposite to said curved surface.

5. The multi-axis bubble vial device of claim 4 in which said surface opposite said curved surface is substantially flat.

6. The multi-axis bubble vial device of claim 1 in which said centrally positioned light source comprises a light emitting diode.

7. The multi-axis bubble vial device of claim 1 in which each of said four light sensors comprises a photodiode.

8. The multi-axis bubble vial device of claim 1 in which the sides of said fluid chamber between said curved upper surface and said opposite surface are light absorbing, whereby extraneous light reflections are reduced.

9. The multi-axis bubble vial device of claim 8 in which said bubble vial is shielded from extraneous light which might introduce error into the orientations measured for said first and second axes.

10. The multi-axis bubble vial device of claim 1 in which said reflector comprises a reflective coating on the outside, bottom surface of said bubble vial.

11. A multi-axis orientation determination device, comprising:
    a bubble vial having a vial body defining a fluid chamber with a curved upper surface,
    a quantity of fluid partially filling said chamber, said fluid defining a bubble in the upper portion of said chamber which moves along said upper surface in dependence upon the orientation of said vial,
    a centrally positioned light source above said bubble vial directing light into said chamber,
    light sensors positioned above said bubble vial and arranged circumferentially around said centrally positioned light source, a first pair of said sensors being positioned on opposite sides of said light source along a first axis, and a second pair of said sensors being positioned on opposite sides of said light source along a second axis, said second axis being substantially perpendicular with respect to said first axis, each of said sensors providing a electrical output signal in dependence upon received light,
    a reflector beneath said fluid chamber such that light emitted from said light source passes through said bubble and said fluid and is reflected by said reflector to said light sensors,
    a first circuit, responsive to the electrical output signals from said first pair of sensors, for providing an indication of the orientation of said bubble vial in the direction of said first axis from the relative levels of light detected by said first pair of sensors, and
    a second circuit, responsive to the electrical output signals from said second pair of sensors, for providing an indication of the orientation of said bubble vial in the direction of said second axis from the relative levels of light detected by said second pair of sensors.

12. The multi-axis bubble vial device of claim 11 in which said reflector comprises a mirrored reflector positioned beneath said bubble vial.

13. The multi-axis bubble vial device of claim 12 in which said reflector comprises a mirror having a reflective surface, said mirror being adhesively secured to said bubble vial by an adhesive having a refractive index which is substantially the same as the refractive index of the material from which said bubble vial is made.

14. The multi-axis bubble vial device of claim 11 in which said reflector comprises a reflective coating in said fluid chamber on the surface of said chamber opposite to said curved surface.

15. The multi-axis bubble vial device of claim 14 in which said surface opposite said curved surface is substantially flat.

16. The multi-axis bubble vial device of claim 11 in which said centrally positioned light source comprises a light emitting diode.

17. The multi-axis bubble vial device of claim 11 in which each of said light sensors comprises a photodiode.

18. The multi-axis bubble vial device of claim 11 in which the sides of said fluid chamber between said curved upper surface and said opposite surface are light absorbing, whereby extraneous light reflections are reduced.

19. The multi-axis bubble vial device of claim 18 in which said bubble vial is shielded from extraneous light which might introduce error into the orientations measured for said first and second axes.

20. The multi-axis bubble vial device of claim 11 in which said reflector comprises a reflective coating on the outside, bottom surface of said bubble vial.

21. A bubble vial device, comprising:
 a bubble vial having a vial body defining a fluid chamber with a curved upper surface,
 a quantity of fluid partially filling said chamber, said fluid defining a bubble in the upper portion of said chamber which moves along said upper surface in dependence upon the orientation of said vial,
 a centrally positioned light source above said bubble vial directing light into said chamber,
 a plurality of sensors positioned above said bubble vial and arranged circumferentially around said centrally positioned light source,
 a reflector beneath said fluid chamber, such that light emitted from said light source passes through said bubble and said fluid and is reflected by said reflector to said light sensors, whereby the relative levels of light detected by said sensors indicates the orientation of said bubble vial device.

22. The bubble vial device of claim 21 in which said reflector comprises a mirrored reflector positioned beneath said bubble vial.

23. The bubble vial device of claim 22 in which said reflector comprises a mirror having a reflective surface, said mirror being adhesively secured to said bubble vial by an adhesive having a refractive index which is substantially the same as the refractive index of the material from which said bubble vial is made.

24. The bubble vial device of claim 21 in which said reflector comprises a reflective coating in said fluid chamber on the surface of said chamber opposite to said curved surface.

25. The bubble vial device of claim 24 in which said surface opposite said curved surface is substantially flat.

26. The bubble vial device of claim 21 in which said centrally positioned light source comprises a light emitting diode.

27. The bubble vial device of claim 21 in which each of said light sensors comprises a photodiode.

28. The bubble vial device of claim 21 in which the sides of said fluid chamber between said curved upper surface and said opposite surface are light absorbing, whereby extraneous light reflections are reduced.

29. The bubble vial device of claim 28 in which said bubble vial is shielded from extraneous light which might introduce error into the orientations measured for said first and second axes.

30. The bubble vial device of claim 21 in which said reflector comprises a reflective coating on the outside, bottom surface of said bubble vial.

31. The bubble vial device of claim 21 in which said plurality of sensors positioned above said bubble vial are substantially equally spaced circumferentially, and in which said plurality of sensors includes an odd number of sensors.

32. The bubble vial device of claim 31 in which said plurality of sensors comprises three sensors.

33. The bubble vial device of claim 21 in which said plurality of sensors positioned above said bubble vial are substantially equally spaced circumferentially, in which said plurality of sensors includes an even number of sensors, and in which said plurality of sensors is grouped into a plurality of pairs of sensors.

* * * * *